(12) United States Patent
Thevenon et al.

(10) Patent No.: US 8,681,812 B2
(45) Date of Patent: Mar. 25, 2014

(54) METHOD AND DEVICE FOR ANALYZING TRANSACTION PROPAGATION IN A MULTIPROTOCOL NETWORK OF A SYSTEM ON CHIP

(75) Inventors: Julien Thevenon, Grenoble (FR); Antoine Perrin, Seyssinet Pariset (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 313 days.

(21) Appl. No.: 13/288,428

(22) Filed: Nov. 3, 2011

(65) Prior Publication Data

US 2012/0051370 A1 Mar. 1, 2012

Related U.S. Application Data

(63) Continuation-in-part of application No. PCT/IB2010/001402, filed on May 5, 2010.

(30) Foreign Application Priority Data

May 7, 2009 (FR) ...................................... 09 02206

(51) Int. Cl.
*H04J 3/16* (2006.01)
(52) U.S. Cl.
USPC .......................................... 370/466; 370/252
(58) Field of Classification Search
None
See application file for complete search history.

(56) References Cited

U.S. PATENT DOCUMENTS

| 6,732,307 | B1 | 5/2004 | Edwards | 714/724 |
| 2007/0002894 | A1* | 1/2007 | Peterson | 370/466 |
| 2008/0244120 | A1* | 10/2008 | Park | 710/65 |
| 2010/0188990 | A1* | 7/2010 | Raleigh | 370/252 |

OTHER PUBLICATIONS

Ciordas, C. et al., "An Event-Based Network-On-Chip Monitoring Service", Ninth IEEE International High-Level Design Validation and Test Workshop, Sonoma Valley, CA, Nov. 10-12, 2004, pp. 149-154.

* cited by examiner

*Primary Examiner* — Duc C Ho
(74) *Attorney, Agent, or Firm* — Seed IP Law Group PLLC

(57) ABSTRACT

A method for following up a transaction in a network comprising at least one node and at least two data transmission links connected to the node and managed in accordance with at least one data transmission protocol, the method comprising picking up transactions during their transmission by links of the network, converting the transactions picked up into a same format, memorizing converted transactions, so as to be able to identify a link where each memorized transaction has been picked up, and comparing a converted transaction and to be correlated with memorized transactions, the transaction to be correlated being correlated with a memorized transaction if the comparison reveals a correspondence between the transactions to be correlated and memorized.

35 Claims, 4 Drawing Sheets

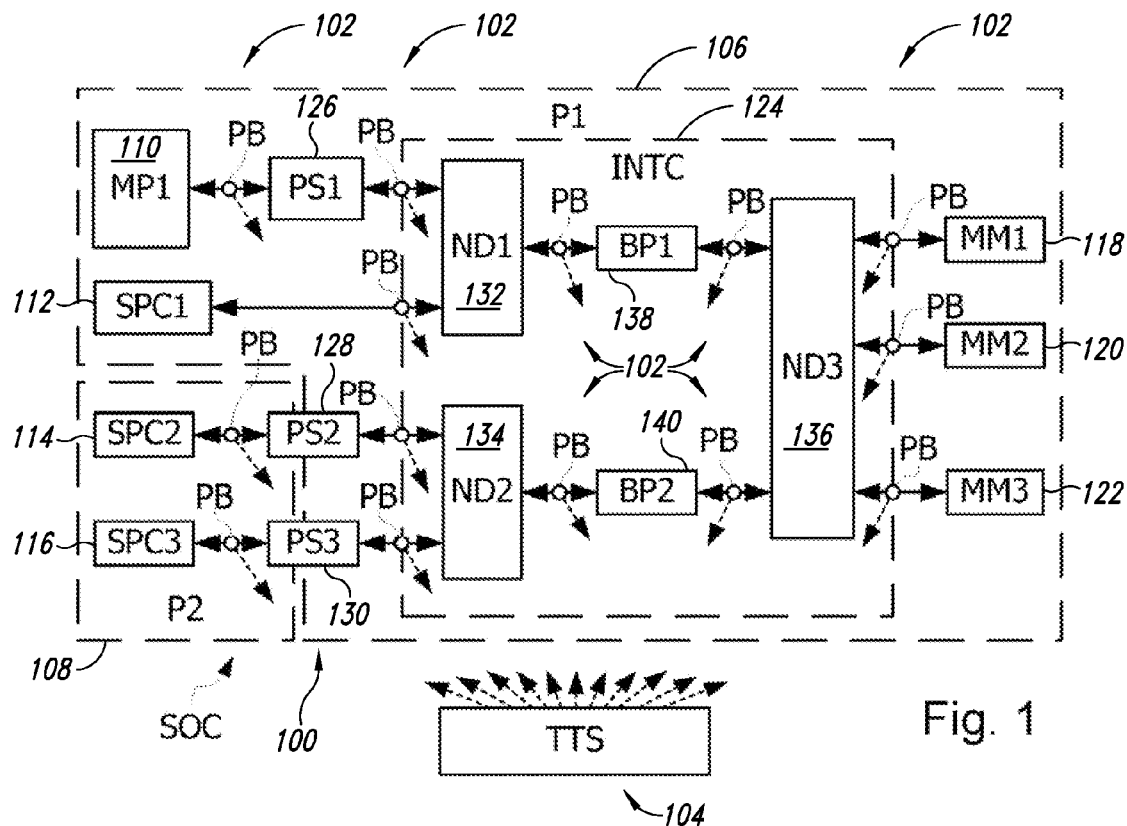
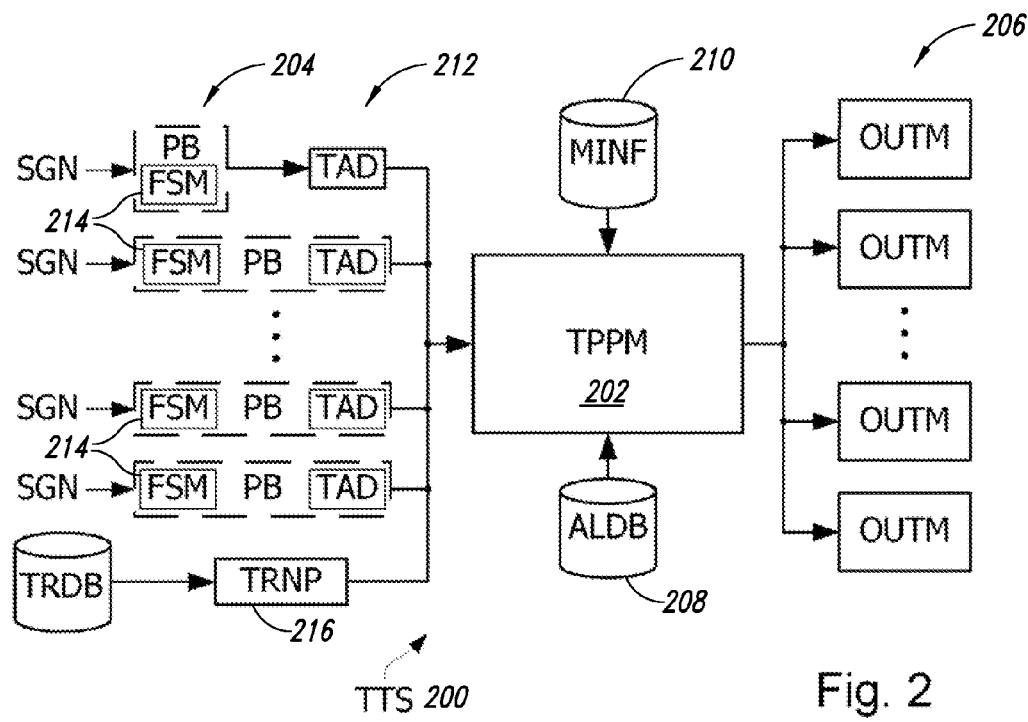

METHOD AND DEVICE FOR ANALYZING TRANSACTION PROPAGATION IN A MULTIPROTOCOL NETWORK OF A SYSTEM ON CHIP

BACKGROUND

1. Technical Field

The present disclosure relates to data propagation within a data transmission network. The present disclosure applies in particular to SOCs (Systems On Chip) comprising at least one node, two data links managed in accordance with at least one data transmission protocol.

2. Description of the Related Art

SOCs increasingly tend to gather into a same integrated circuit hardware components such as heterogeneous processor cores, specialized circuits, and memories, as well as a complex communication architecture called "network on chip" NOC, linking the components between them. A network on chip usually comprises several point-point data links linking the hardware components of the system on chip. The data links between the hardware components of a system on chip may be made using buses complying with several protocols such as STBus and VSTNOC of the company STMicroelectronics, AXI and AHB of the company ARM, OCP of the company SONICS, DTL and MTL of the company NXP, and Danube of the company ARTERIS. Such a network may carry data of different natures while respecting different carrying constraints. Thus, data of the voice or sound type generally require a low latency and a relatively low bandwidth. Data of the video sequence type also generally require a low latency, but also a high bandwidth. On the other hand, carrying ordinary data does not generally require a high latency, and a variable bandwidth. A certain quality of service is desired whatever the type of data.

Due to the increasing complexity of systems on chip, it is desirable to implement designing, modeling and simulation tools allowing a system to be tested at different designing steps, so as to be able to validate the system at each step. It is also desirable to be able to test a system once it is totally or partially implemented into an integrated circuit.

Generally, developing a complex system such as a system on chip starts with a step of defining specifications written in informal language. Then, there is a step of defining or selecting algorithms to match the specifications. The algorithms may be defined using a high level language like Matlab or C++. Defining the algorithms makes it possible to pass to a step of defining models of a first level of abstraction called "Transaction Level Model" TLM describing an architecture and therefore specifying a distribution between hardware and software (definition of the hardware components and software executed by the hardware components). The Transaction Level Model may gather functional models PV (Programmer View) and timed models PVT (Programmer View+Timing). A functional model makes it possible for example to simulate software embedded in a hardware component of the system. In a functional model, data transfers between the hardware components may be simulated by an ideal unique communication channel, i.e., having a not limited rate. Timed models make it possible to precociously evaluate a choice of architecture and distribution of processes between hardware and software. In order to specify the time constraints that the hardware components of the system will have to respect, the size of the words and the rate of the communication channels may be fixed. A Transaction Level Model may be defined using a language for modeling hardware systems such as SystemC, making it possible to represent hardware components by modules which are linked between them by ports connected to communication channels. The behaviors of hardware and software components are described by processes executing code in a programming language such as C++. All the hardware and software components of a system may thus be modeled using SystemC, whatever the nature and the abstraction level thereof. The following development step consists in adding the clock concept to create a model with the precision of the BCA (Bus Cycle Accurate) cycle specifying the behavior of the system at each cycle of a clock clocking the system. Then there is the step for defining the Register Transfer Level RTL which then allows an integrated circuit to be rapidly and efficiently synthesized. The level RTL defines the value of each bit at each clock pulse using a language such as VHDL or Verilog. The level RTL then makes it possible to define logic gate networks which may be processed by placement and routing tools to obtain a two-dimension structure which serves as a base to make masks for manufacturing the integrated circuit.

BRIEF SUMMARY

An embodiment relates to a method for following up a transaction in a network comprising at least one node and at least two links for transmitting data connected to the node and managed in accordance with at least one data transmission protocol. According to one embodiment, the method comprises: picking up transactions during their transmission by links of the network, converting the transactions picked up into a same format, memorizing converted transactions, so as to be able to identify a link where each transaction memorized has been picked up, and comparing a transaction converted and to be correlated with memorized transactions, the transaction to be correlated being correlated with a memorized transaction if the comparison reveals a correspondence between the transactions to be correlated and memorized. According to one embodiment, the method comprises searching among the memorized transactions, transactions picked up from adjacent links at a link where the transaction to be correlated has been picked up, comparing the transaction to be correlated being limited to the transactions found. According to one embodiment, comparing two transactions comprises executing on data of the two transactions a comparison algorithm selected according to a type of the links where the two transactions have been picked up. According to one embodiment, the comparison algorithms comprise an algorithm which supplies a positive correlation result when the content of the two transactions is identical, and algorithms which supply a positive correlation result when the content of one of the two transactions is located in the other transaction. According to one embodiment, each transaction converted is memorized in a temporary storage cell selected according to the link where the transaction has been picked up, a cell being allotted to each link where a transaction may be picked up. According to one embodiment, the method comprises removing a memorized transaction from the cell where it is memorized when it has totally been correlated with one or more other transactions. According to one embodiment, a converted transaction comprises transaction beginning and end data, transaction content data, a piece of information indicating if the transaction is of the request or answer type, a transaction identifier, and if the transaction is of the answer type, an identifier of a transaction of the request type corresponding to the transaction of the answer type. According to one embodiment, only the transactions of the request type are memorized in preparation for a comparison with another transaction. According to one embodiment, the method comprises correlating a transaction of the answer type with a memorized transaction of the request type, and deleting the memorized transaction of the request type only if the transaction of the request type may not be propagated to other links and if the link where the transaction of the request type has been picked up may not transmit a transaction of the answer type corresponding to the transaction of the request type before the request is executed by the system.

An embodiment relates to a device for following up a transaction in a network comprising at least one node and at least two links for transmitting data connected to the node and managed in accordance with at least one data transmission protocol, the device comprising probes connected to the data transmission links to pick up transactions transmitted by the links. According to one embodiment, the device is configured to implement embodiments of one or more of the methods described herein. According to one embodiment, the probes are associated to a module for converting transactions into a same format. According to one embodiment, the device comprises a set of memory cells comprising a memory cell by probe. According to one embodiment, the device comprises at least one output module configured to receive pairs of correlated transactions and to process the information so as to perform an analysis of the propagation of transactions in the network, and/or to save the information and/or display them on a visualization screen, and/or to determine transmission latencies, and/or to elaborate statistics of transmission or network load, and/or to perform processes defined by users.

An embodiment relates to a program saved on a support readable and executable by a computer, configured to implement embodiments of one or more of the methods as described herein, when it is executed by a computer.

In an embodiment, a method comprises: using at least one processing device to follow up a transaction in a network comprising at least one node and at least two links for transmitting data connected to the node and managed in accordance with at least one data transmission protocol, by: picking up transactions during their transmission by links of the network; converting the transactions picked up into a same format; memorizing converted transactions, so as to be able to identify a link where each transaction memorized has been picked up; and comparing a transaction converted and to be correlated with memorized transactions, the transaction to be correlated being correlated with a memorized transaction if the comparison reveals a correspondence between the transactions to be correlated and memorized. In an embodiment, the method comprises searching among the memorized transactions, transactions picked up from adjacent links at a link where the transaction to be correlated has been picked up, comparing the transaction to be correlated being limited to the transactions found. In an embodiment, comparing two transactions comprises executing on data of the two transactions a comparison algorithm selected according to a type of the links where the two transactions have been picked up. In an embodiment, the comparison algorithm is selected from a set of comparison algorithms comprising an algorithm which supplies a positive correlation result when the content of the two transactions is identical, and algorithms which supply a positive correlation result when the content of one of the two transactions is located in the other transaction. In an embodiment, each transaction converted is memorized in a temporary storage cell selected according to the link where the transaction has been picked up, a cell being allotted to each link where a transaction may be picked up. In an embodiment, the method comprises removing a memorized transaction from the cell where it is memorized when it has totally been correlated with one or more other transactions. In an embodiment, a converted transaction comprises transaction beginning and end data, transaction content data, a piece of information indicating if the transaction is of the request or answer type, a transaction identifier, and if the transaction is of the answer type, an identifier of a transaction of the request type corresponding to the transaction of the answer type. In an embodiment, only the transactions of the request type are memorized in preparation for a comparison with another transaction. In an embodiment, the method comprises correlating a transaction of the answer type with a memorized transaction of the request type, and deleting the memorized transaction of the request type only if the transaction of the request type may not be propagated to other links and if the link where the transaction of the request type has been picked up may not transmit a transaction of the answer type corresponding to the transaction of the request type before the request is executed by the network.

In an embodiment, a device comprises: means for picking up transactions transmitted over a plurality of links of a network; means for converting picked up transactions into a first format; means for memorizing converted transactions, so as to be able to identify a link where each transaction memorized has been picked up; and means for comparing a transaction converted and to be correlated with memorized transactions, the transaction to be correlated being correlated with a memorized transaction if the comparison reveals a correspondence between the transactions to be correlated and memorized. In an embodiment, the means for picking up transactions comprises a plurality of probes, each probe coupled to a respective link and to the means for converting. In an embodiment, the means for memorizing comprises a set of memory cells each associated with a respective probe in the plurality of probes. In an embodiment, the device further comprises at least one output module configured to receive pairs of correlated transactions and to process information in the pairs so as perform at least one of the following: an analysis of the propagation of transactions in the network; saving the information; a display of the information on a visualization screen; a determination of transmission latencies; a generation of statistics of transmission or network load; and a user-defined process.

In an embodiment, a computer readable memory medium's contents cause at least one processor to perform a method, the method comprising: picking up transactions transmitted over a plurality of links of a network; converting picked up transactions to a first format; memorizing converted transactions, so as to be able to identify a link where each transaction memorized has been picked up; and comparing a transaction converted with memorized transactions and correlating a converted transaction with a memorized transaction when the comparison reveals a correspondence between the transactions. In an embodiment, the comparing is limited to comparing the converted transaction to be compared with memorized transactions picked up at links adjacent links to a link where the converted transaction to be compared has been picked up. In an embodiment, comparing two transactions comprises executing on data of the two transactions a comparison algorithm selected according to a type of the links where the two transactions have been picked up. In an embodiment, the comparison algorithm is selected from a set of comparison algorithms comprising an algorithm which supplies a positive correlation result when content of the two transactions is identical, and algorithms which supply a positive correlation result when content of one of the two transactions is located in the other transaction. In an embodiment, each transaction converted is memorized in a temporary storage cell selected according to the link where the transaction has been picked up. In an embodiment, the method further comprises removing a memorized transaction from the cell where it is memorized when it has totally been correlated with one or more other transactions. In an embodiment, the first format comprises transaction beginning and end data, transaction content data, a piece of information indicating if the transaction is of the request or answer type, a transaction identifier, and if the transaction is of the answer type, an identifier of a transaction of the request type corresponding to the transaction of the answer type. In an embodiment, only the transactions of the request type are memorized in preparation for a comparison with another transaction. In an embodiment, the method comprises correlating a transaction of the answer type with a memorized transaction of the request type, and deleting the memorized transaction of the request type only if the transaction of the request type may not be propagated to other links and if the link where the transaction of the request type has been picked up may not transmit a transaction of the answer type corresponding to the transaction of the request type before the request is executed by the network.

In an embodiment, a device comprises: a plurality of probes configured to pick up transactions transmitted over a plurality of links of a network; a transaction conversion module configured to convert picked up transactions into a first format; a memory configured to store converted transactions, so as to be able to identify a link where each transaction stored has been picked up; and a transaction logic module configured to compare a converted transaction with stored converted transactions and when the comparison reveals a correspondence between the converted transaction and a stored converted transaction, to correlate the converted transaction and the stored converted transaction. In an embodiment, the transaction conversion module comprises a plurality of transaction converters each coupled to a respective probe of the plurality of probes. In an embodiment, the memory comprises a set of memory cells each associated with a respective probe in the plurality of probes and configured to store converted transactions. In an embodiment, the transaction logic module is configured to remove a stored transaction from a cell where it is stored when it has totally been correlated with one or more other transactions. In an embodiment, the transaction logic module is configured to limit the comparing of a converted transaction to stored converted transaction picked up at links adjacent links to a link where the converted transaction to be compared has been picked up. In an embodiment, the transaction logic module is configured to execute on data of two transactions a comparison algorithm selected according to a type of link where the two transactions have been picked up. In an embodiment, the transaction logic module is configured to select the comparison algorithm from a set of comparison algorithms comprising an algorithm which supplies a positive correlation result when content of the two transactions is identical, and algorithms which supply a positive correlation result when content of one of the two transactions is located in the other transaction. In an embodiment, the first format comprises transaction beginning and end data, transaction content data, a piece of information indicating if the transaction is of the request or answer type, a transaction identifier, and if the transaction is of the answer type, an identifier of a transaction of the request type corresponding to the transaction of the answer type. In an embodiment, the memory is configured to store only transactions of the request type in preparation for a comparison with another transaction. In an embodiment, the transaction logic module is configured to correlate a transaction of the answer type with a stored transaction of the request type, and delete the stored transaction of the request type only if the transaction of the request type may not be propagated to other links and if the link where the transaction of the request type has been picked up may not transmit a transaction of the answer type corresponding to the transaction of the request type before the request is executed by the network.

In an embodiment, a system comprises: a plurality of nodes; a plurality of probes configured to pick up transactions transmitted over a plurality of links, the links coupled to nodes of the system; a transaction conversion module configured to convert picked up transactions into a first format; a memory configured to store converted transactions, so as to be able to identify a link where each converted transaction stored has been picked up; and a transaction logic module configured to compare a converted transaction with stored converted transactions and when the comparison reveals a correspondence between the converted transaction and a stored converted transaction, to correlate the converted transaction and the stored converted transaction. In an embodiment, the memory comprises a set of memory cells each associated with a respective probe in the plurality of probes and configured to store converted transactions. In an embodiment, the transaction logic module is configured to remove a stored transaction from a cell where it is stored when it has totally been correlated with one or more other transactions.

BRIEF DESCRIPTION OF THE SEVERAL VIEWS OF THE DRAWINGS

Embodiments will be described hereinafter, in relation with, but not limited to the appended figures wherein:

FIG. 1 schematically shows a system on chip comprising a multi-protocol network on chip, and a device for following up the propagation of transactions in the network on chip, FIG. 2 schematically shows a device for following up the propagation of transactions, according to one embodiment.

DETAILED DESCRIPTION

Figure 3:
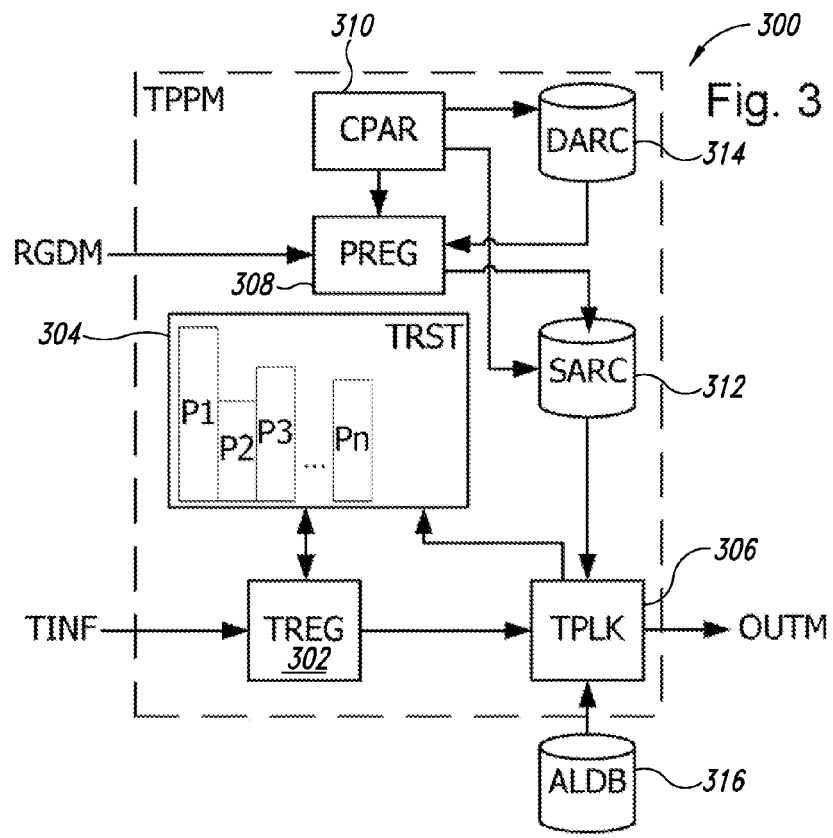
FIG. 3 is a schematic view of a module for following up the propagation of transactions of the device shown in FIG. 2.

In the following description, numerous specific details are given to provide a thorough understanding of embodiments. The embodiments can be practiced without one or more of the specific details, or with other methods, components, materials, etc. In other instances, well-known structures, materials, or operations, such as, for example, storage cells, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The performances of a network and in particular a network on chip have a significant impact on the performances of the system integrating the network. It is therefore desirable to be able to analyze the traffic of the network, characterize the use thereof, and in particular follow the propagation of data in the network. It is desirable that such an analysis is made soon enough during the design and development of a system on chip, in order to avoid reconsidering design choices made during previous development steps of the system.

The abstraction levels TLM, BCA and RTL allow the performances of a system architecture to be thoroughly studied before implementing the system and embedding it into an integrated circuit. The follow up of data propagation in a system is usually made using probes connected to different links of the system, all the components of the system not being necessarily modeled in a same abstraction level.

However, the existing tools for analyzing or monitoring the network usually comply only with one network protocol. In the event of a complex network comprising links matching different transmission protocols, it may be difficult to correlate between them data or signals taken by different probes from a path between an initiator component and a target component. It may also be difficult to correlate a request message with an answer message to the request message. In addition, the data of a message transmitted in the network may be at some times distributed in several links of the network. It is then difficult to follow the data transmitted and to determine that a piece of data detected by a probe is located at another time with other data in a same message.

It is therefore desirable to be able to follow the propagation of data transmitted in a multi-protocol network and in particular a network on multi-protocol chip, whatever the complexity of the network, and that the data transmitted stay together into a message, or be at another time distributed in several other messages transmitted by several different links of the network.

FIG. 1 shows a system on chip SOC 100 comprising probes PB 102 connected to a device 104 for following up the propagation of transactions TTS, according to one embodiment. The system SOC 100 is in a design state comprising several parts defined at different abstraction levels. For example, the system SOC comprises a first part P1 106 at the abstraction level at the clock cycle precision BCA and a second part P2 108 at the transaction abstraction level TLM. The system SOC 100 comprises transaction initiators MP1 110, SPC1 112, SPC2 114, SPC3 116, transaction targets MM1 118, MM2 120, MM3 122, an interconnection network INTC 124 between initiators and targets, and gateways PS1 126, PS2 128, PS3 130 between the initiators MP1 110, SPC2 112 and SPC3 116 and the network INTC 124. The network INTC 124 comprises nodes ND1 132, ND2 134, ND3 136. The node ND1 132 is linked to the node ND3 136 through a bus gateway BP1 138. The node ND2 134 is linked to the node ND3 136 through a bus gateway BP2 140. The initiator MP1 110 is linked to the node ND1 132 through the gateway PS1 126. The initiator SPC1 112 is connected to the node ND1 132. The initiators SPC2 114 and SPC3 116 are linked to the node ND2 134 through gateways PS2 128 and PS3 130. The node ND3 136 is connected to the transaction targets MM1 118, MM2 120 and MM3 122. Each link between the system components is monitored by a probe PB 102 which listens to the signals transmitted by the link, converts them into a format defined by a transmission protocol, and transmits them to the device TTS 104. The initiator MP1 110 may be, for example, a simulated or real microprocessor core. The initiators SPC1 112, SPC2 114 and SPC3 116 may be, for example, specialized process components, real or modeled at abstraction levels which may differ. Thus the initiator SPC1 112 may be, for example, a traffic generator which generates a transaction flow. The initiators SPC2 114 and SPC3 116 may be, for example, modeled by Transaction Level Models respectively of PV and PVT type. The transaction targets MM1 118, MM2 120 and MM3 122 may be, for example, memories of different models, real or simulated. The bus gateways BP1 138, BP2 140 may be, for example, buffer memories.

In the following description, the term "transaction" refers to a request or answer message transmitted between two components of a system, such as the system 100 of FIG. 1.

FIG. 2 shows an embodiment of a device 200 for following up the propagation of transactions TTS, according to one embodiment. The device TTS 200 comprises a module 202 for following up transactions TPPM connected on one side to probes PB 204, and on the other side to output modules OUTM 206. The module TPPM 202 receives transaction data transmitted by the probes PB 204. The module TPPM 202 has an access to an algorithm database ALDB 208 and to information MINF 210 relating to a system network topology SOC, such as, for example, a topology of the system 100 of FIG. 1. The database ALDB 208 comprises algorithms executable on data of a pair of transactions transmitted in the system network SOC to determine if the two transactions are correlated or not. The information MINF 210 defines all the links of a network, i.e., in particular to which components of the system they are connected. The module TPPM 202 is configured to allow the path followed by a transaction in the system network SOC to be determined by correlating between them by pair transactions detected by the probes PB 204 adjacent in the network. Hereinafter, two probes or two links are considered to be adjacent in the network when there is a path in the network linking the two probes or links, not comprising other probe or link between them where a transaction may be picked up.

The probes PB 204 comprise a transaction adaptation module TAD 212 to convert each transaction detected in a unique format whatever the data transmission link to which the probe is connected and the associated transmission protocol. In some cases, in particular when the probe was designed by a third party, the module TAD 212 may be external to the probe. The module TAD 212 is then adapted to the format of the output data of the probe. The probes PB 204 also comprise a finite state machine FSM 214 to constitute transactions from received signals.

The module TAD 212 is configured to supply each transaction picked up by the probe PB 204 in the form of a data set comprising a request or answer beginning event, a request or answer content, and a request or answer end event. The request or answer beginning and end events comprise a probe identifier PB, a date of detection of the event by the probe and a transaction identifier. The answer end event also comprises an identifier of the corresponding request transaction. A request or answer content comprises a probe identifier associated to the request or answer content data. The content data comprise a global size in number of transferred data blocks, a length of data to be transferred specifying the size of a data block, and a destination address of the transferred data. The content data may also comprise optional parameters, in particular to be able to take into account specificities imposed by some protocols.

Transactions may also be injected into the module TPPM 202 by a component simulation module TRNP 216 which simulates a system component SOC. To that end, the module TRNP 216 is configured to transmit to the module TPPM transactions coming for example from a transaction base TRDB 218 at predefined times.

The output modules OUTM 206 are configured to receive correlated transaction pairs and the respective contents thereof, and to process the information so as to perform analyzing the propagation of the transactions in the network, or simply to save the information or display them on a visualization screen. The modules OUTM 206 may thus be configured to determine transmission latencies, elaborate transmission statistics or network load, or perform other processes defined by users.

FIG. 3 shows an embodiment of a module 300 for following up transactions TPPM. The module TPPM 300 comprises a transaction register module TREG 302, a set of temporary transaction storage cells TRST 304, a transaction correlation module TPLK 306, a probe register module PREG 308, and a configuration data process module CPAR 310. The module TPPM 300 also comprises a database SARC 312 comprising data describing a system architecture SOC (for example, system SOC 100 of FIG. 1), as well as a database DARC 314 which comprises in particular specifications of default links between two components of the system SOC, and in particular between two adjacent probes PB. The data of base SARC 312 indicate in particular a transaction correlation algorithm for each pair of adjacent probes of the system SOC, this algorithm being defined in a base ALDB 316. When a probe is not activated particularly for performance reasons, a link is created in the database SARC 312 between two adjacent active probes of the not activated probe to keep the links of the network.

The module PREG 308 is configured to receive, for example during a phase of resetting the device TTS (see TTS 200 of FIG. 2), probe PB registration requests, each comprising a probe identifier and an identifier of the link to which the probe is connected. Upon receiving a registration request, the module PREG 308 creates a cell P1-Pn in the set TRST 304 for the probe to be registered and asks the module CPAR 310 to register in the base SARC 312 describing the system architecture SOC, the identifier of the probe in relation with the link identifier.

The module TREG 302 receives transaction data TINF from the probes PB (see, for example, the probes PB 102 of FIG. 1 or the probes 204 of FIG. 2). If the transaction TINF is of the request type, the module TREG 302 searches through the set TRST 304 a cell P1-Pn allotted to the probe which has transmitted the transaction data received. If a cell has been allotted to the probe, the module TRST 304 transfers the transaction data to the module TPLK 306 and registers them in the cell P1-Pn allotted to the probe which has transmitted the transaction data received. In an embodiment, transactions of answer type are not memorized in a cell P1-Pn.

The module TPLK 306 is configured to correlate each transaction to be processed, transmitted by the module TREG 302 with one or more transactions called "related transactions" previously memorized in one of the cells of the set TRST 304. To that end, the module TPLK 306 searches through the set TRST 304 the related transactions for each transaction received, using the system architecture data SARC 312 and the correlation algorithm database ALDB 316. If a related transaction is found, the module TPLK 306 removes it from the cell P1-Pn where it has been found, and transmits the transaction received and the related transaction found to the output modules OUTM (see output modules OUTM 206 of FIG. 2).

Figure 4:
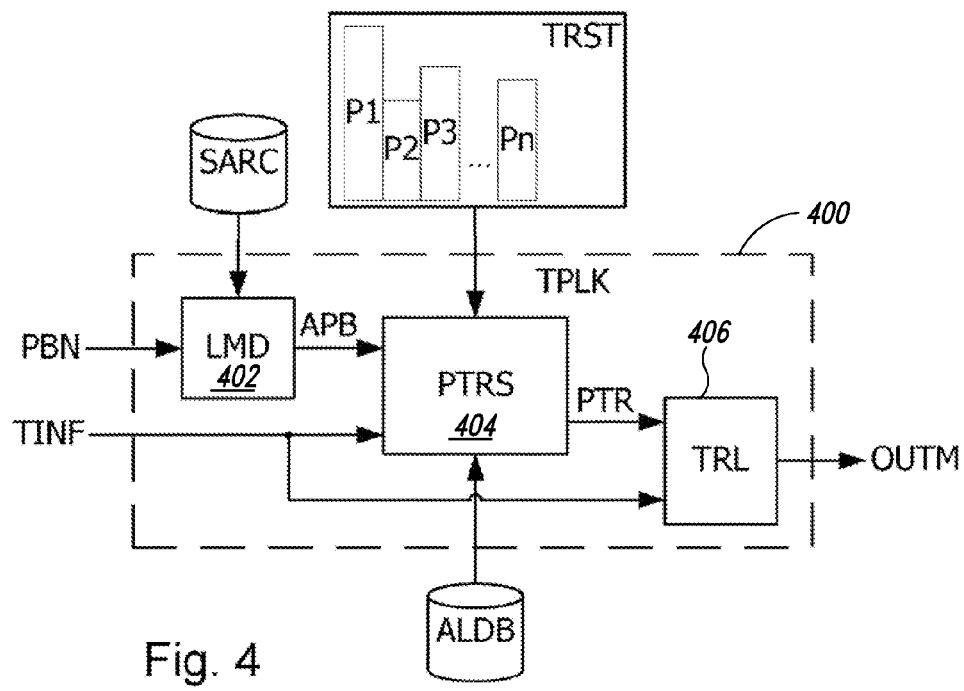
FIG. 4 is a schematic view of a module for correlating transactions of the module shown in FIG. 3.

FIG. 4 shows an embodiment of a module TPLK 400 suitable for use, for example, in the embodiments of FIGS. 1-3. The module TPLK 400 comprises a module for determining LMD 402 probes adjacent to the probe which has emitted the transaction TINF to be processed, a module for searching PTRS 404 potentially related transactions through the cell set TRST, and a module for selecting TRL 406 related transactions among the potentially related transactions.

The module LMD 402 receives a probe identifier PBN and searches through the base SARC all the probes adjacent to the probe corresponding to the identifier received PBN, i.e., the probes linked to it through a path in the system SOC not comprising other probes. The module PTRS 404 receives the transaction data TINF to be processed and adjacent probe identifiers APB supplied by the module LMD 402 and reads in the cell P1-Pn of each adjacent probe found the last transaction stored in the cell. The transactions read in the cells P1-Pn are compared to the transaction to be processed TINF to detect correlations. If no correlation is found, the module PTRS 404 reads in the cell P1-Pn of each adjacent probe found the transaction following the last transaction read in the cell, and so forth until a correlation is detected with a transaction read or all the transactions of the cell are read. The transactions read and correlated with the transaction to be processed TINF are considered as transactions related to it and are supplied to the module TRL 406. Normally (except in the event of partial correlation), one and only one related transaction must be found for each transaction TINF received from the module TREG (see, for example, TREG 302 in FIG. 3). If several related transactions are extracted from the set TRST, the module TRL 406 selects one of them and supplies it to the output modules OUTM with the processed transaction TINF.

Figure 5:
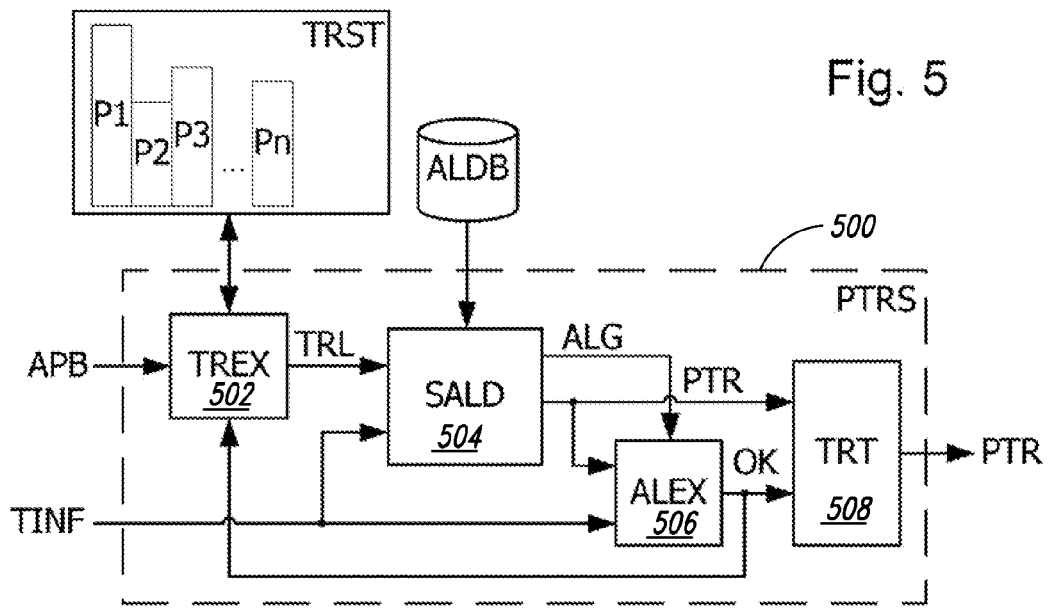
FIG. 5 is a schematic view of a module for searching transactions of the module shown in FIG. 4.
Figure 6:
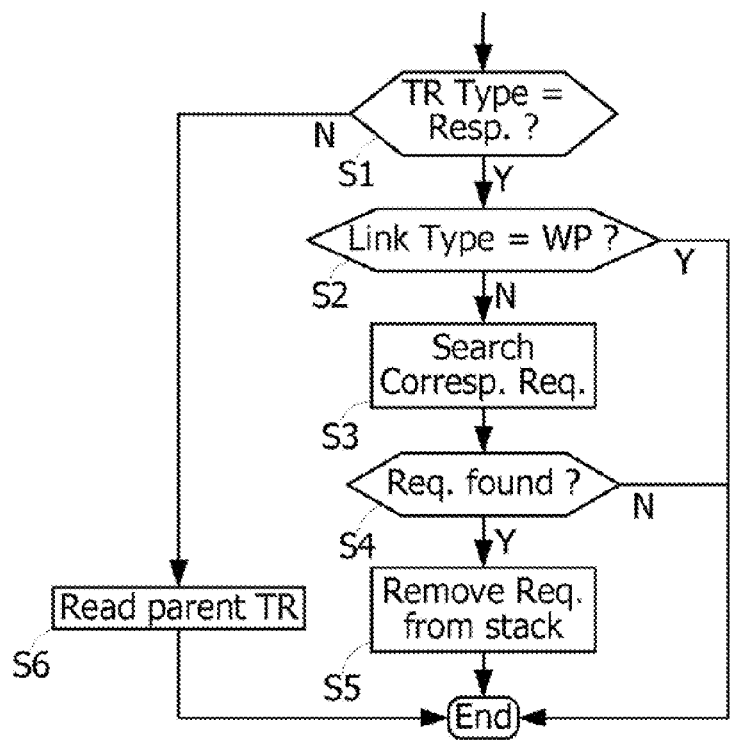
FIG. 6 shows a flowchart of a sequence of steps executed by the module for searching transactions.

FIG. 5 shows an embodiment of a module PTRS 500, suitable for use, for example, in the embodiments of FIGS. 1-4. The module PTRS 500 comprises a transaction extraction module TREX 502, an algorithm search module SALD 504, an algorithm execution module ALEX 506, and a transaction selection module TRT 508. The module TREX 502 receives an identifier of each probe APB adjacent to the probe PBN which has transmitted the transaction to be processed TINF. The module TREX 502 executes, for example, steps S1 to S6 of a sequence of steps shown in FIG. 6. At step S1, the module TREX 502 first determines, from the transaction data TINF, if the transaction is of the answer type. If the transaction TINF is of the answer type, the module TREX 502 determines at step S2 if the link to which is connected the probe PB which has transmitted the transaction TINF is of the type "Write Posting", i.e., if the link may transmit an answer to a request before the request propagates in the network. The module TREX 502 may to that end access the database SARC. If this link is not of the type "Write Posting", the module TREX 502 executes steps S3 and S4 during which it searches the transaction of the request type corresponding to the transaction TINF through the cell P1-Pn of the probe which has transmitted the transaction TINF, (step S3). If the transaction of the request type is found in the cell (step S4), it is removed from the cell (step S5). The transaction TINF is then transmitted to the output modules OUTM without being processed, because it is not necessary to correlate a transaction of the answer type with another transaction since it contains an identifier of the corresponding request.

If the transaction TINF is of the request type, the module TREX 502 reads the transaction data in each cell P1-Pn corresponding to the probe identifiers received APB (step S6). Each extracted transaction which is thus potentially related to the transaction TINF is supplied to the module SALD 504. The module SALD 504 searches through the base ALDB a transaction correlation algorithm according to the types of transactions and the types of links to which are connected the adjacent probe APB which has transmitted the potentially related request and the probe which has transmitted the processed transaction TINF. The module ALEX 506 executes the selected algorithm on the transaction data TINF of the processed transaction TINF and the data of the potentially related transaction. The module ALEX 506 thus supplies to the module TRT 508 a result of execution of an algorithm on a pair of transactions. In parallel, the module TRT 508 receives the transaction data of the related transaction PTR on which the algorithm has been executed. If the result of execution of the algorithm is positive, the potentially related transaction is a related transaction PTR and the module TRT 508 supplies the data of the related transaction PTR. The module TREX 502 then removes the related transaction PTR from the cell P1-Pn where it has been read.

A transaction correlation algorithm comprises, for example, in comparing two by two each data block of the two transactions and in supplying a positive correlation result if all the blocks of the two transactions are strictly identical. Another correlation algorithm may comprise determining if the transaction TINF corresponds to a part of the potentially related transaction. If this is the case, the two transactions are considered as correlated and only the part of the related transaction corresponding to the transaction TINF is removed from the cell P1-Pn by the module TREX 502, or is marked as correlated.

Another correlation algorithm may comprise determining if the potentially related transaction corresponds to a part of the processed transaction TINF. In this case, only the part of the processed transaction corresponding to the related transaction may be considered as correlated, and the module SALD 504 may perform another attempt for correlating the processed transaction with another potentially related transaction, until the whole content of the processed transaction has been correlated with a related transaction. In this case, the module TRL (see, for example, TRL 406 of FIG. 4) supplies as many pairs of processed transaction associated to a related transaction as the number of related transactions found.

Figure 7:
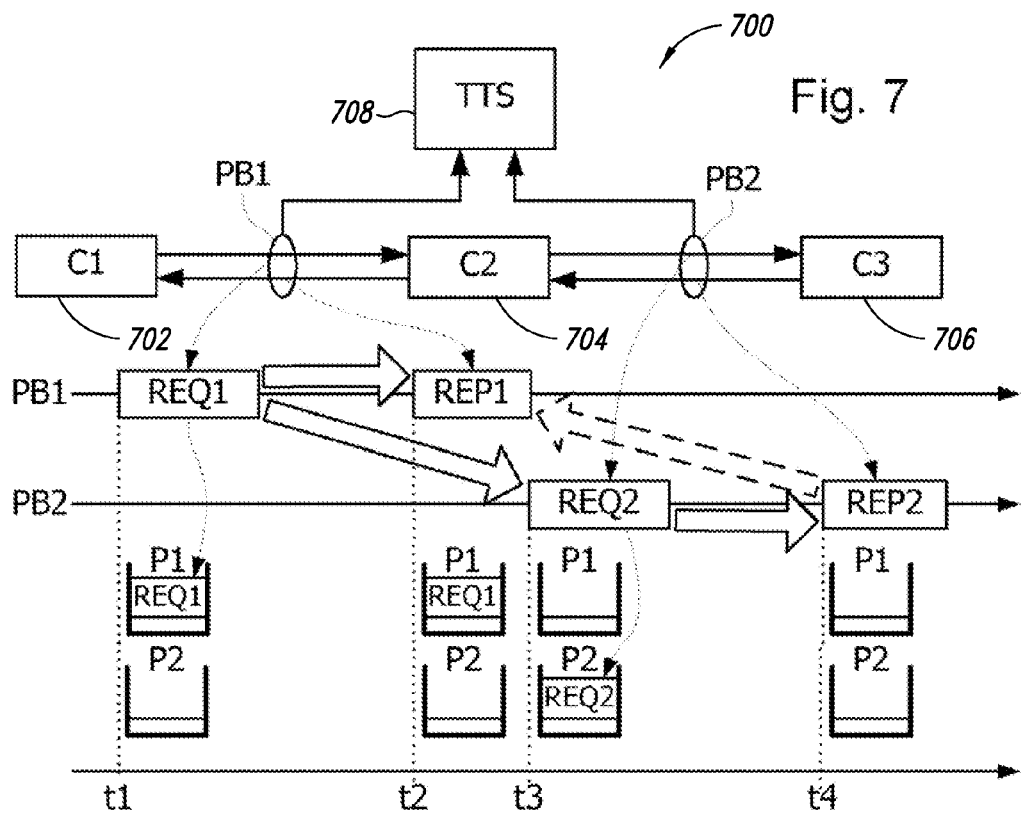
FIG. 7 shows a part of a system comprising two links to which are connected probes, transaction signals picked up by the probes, and the state of the temporary transaction storage cells.

FIG. 7 shows a part of a system 700 on chip comprising three components C1 702, C2 704, C3 706, a link between the components C1 and C2 and a link between the components C2 and C3. Each of the two links is connected to a probe PB1, PB2, the probes being connected to a device 708 for following up the propagation of transactions TTS. FIG. 7 also shows chronograms of transaction signals picked up by the probes PB1, PB2, as well as the content of cells P1, P2 of the set TRST allotted to the probes PB1 and PB2, at successive times t1, t2, t3 and t4. The component C1 emits a transaction of the write request type REQ1 to the component C2. Upon receiving the transaction REQ1, the component C2 transmits in response to the component C1 a transaction of the answer type REP1 and propagates the transaction REQ1 to the component C3 in the form of a new transaction of the write request type REQ2 repeating the content of the request REQ1. After receiving the transaction REQ2, the component C3 executes the request and transmits in response to the component C2 a transaction of the answer type REP2. The probe PB1 successively picks up the transactions REQ1 and REP1 at times t1 and t2, and the probe PB2 successively picks up the transactions REQ2 and REP2 at times t3 and t4.

Normally the answer REP1 should be emitted by the component C2 only after receiving the answer REP2, since the answer REP1 should contain the information of the answer REP2 to be able to inform the component C1 on the actual success or failure of the execution of the request REQ1. For execution speed reasons, some systems follow the operation shown in FIG. 7 comprising, for the intermediate component, here C2, answering to the component emitting the request, here C1, as soon as it receives the request. The result is a violation of the principle of causation. Thus, the thick arrows in continuous line in FIG. 7 represent the links of causality between transactions, while the thick arrow in dotted line represents a violated link of causality. To be able to understand this violation of the principle of causation, the link between the components C1 and C2 is configured of the type "Write Posting" in the base SARC, while the link between the components C2 and C3 is not. The result is that when the device TTS processes the transaction REP1, it does not remove the transaction REQ1 from the cell P1 of the probe PB1, in accordance with the sequence shown in FIG. 6. That way, when the device processes the transaction REQ2, it may be correlated by the device TTS with the transaction REQ1. The transaction REQ1 is thus removed from the cell P1 only after the probe PB2 receives the request REQ2 which is inserted into the cell P2. When the device processes the transaction REP2, it is correlated with the transaction REQ2 thanks to the fact that an answer transaction includes an identifier of the corresponding request transaction. The transaction REQ2 is then removed from the cell P2. It is to be noted that if the transaction REQ2 is picked up by the probe PB2 before the probe REP1 is picked up by the probe PB1, the transaction REQ2 is already correlated with the transaction REQ1 and therefore the transaction REQ1 is no longer in a cell when the transaction REP1 is processed.

Figure 8:
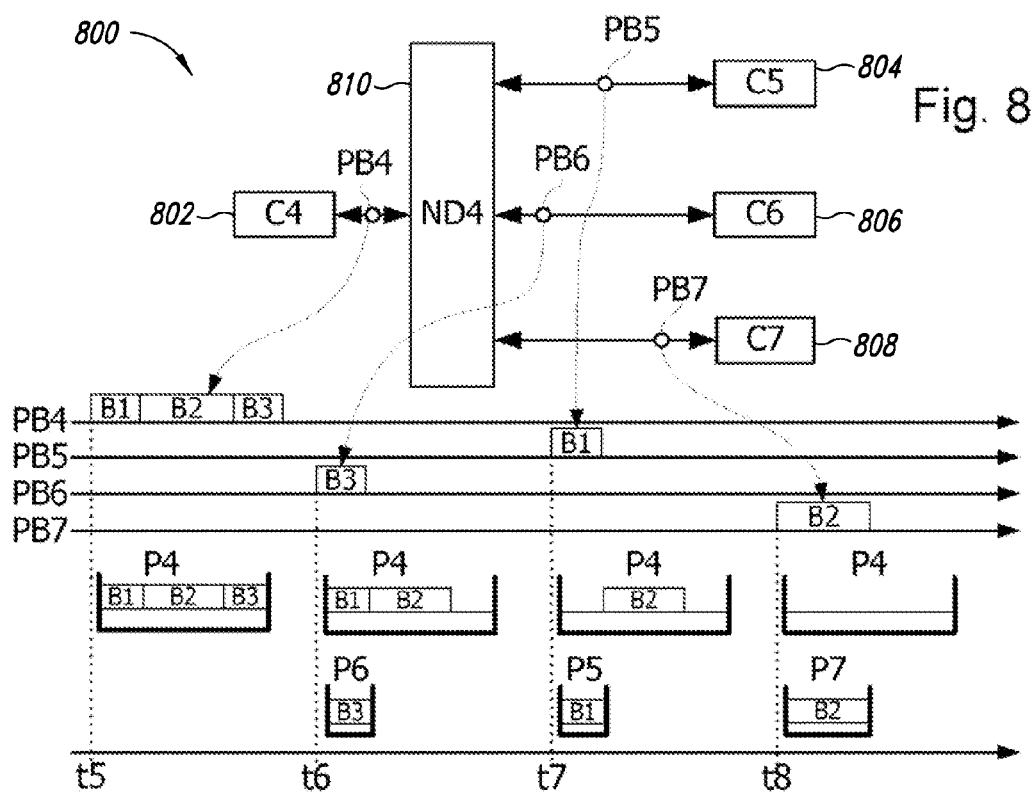
FIG. 8 shows a part of a system comprising several links to which are connected probes, transaction signals picked up by the probes, and the state of the temporary transaction storage cells.

FIG. 8 shows a part of a system 800 on chip comprising four components C4 802, C5 804, C6 806, C7 808, and a network node ND4 810 to which the four components are connected, each link between a component C4-C7 and the network node ND4 being connected to a probe PB4, PB5, PB6, PB7. The probes PB4-PB7 are considered adjacent in a base SARC (see FIG. 3) given that no other probe is arranged between them. FIG. 8 shows a correlation between a first transaction and several subsequent transactions which contents are to be correlated with a part of the content of the first transaction. To that end, FIG. 8 also shows chronograms of transaction signals picked up by the probes PB4-PB7, as well as the content of cells P4, P5, P6, P7 of the set TRST allotted to the probes PB4-PB7, at successive times t5, t6, t7 and t8. To simplify the figure, only the cells P4-P7 which content is modified are shown at each of these times.

At time t5, the probe PB4 picks up on the link between the component C4 and the node ND4 a transaction comprising three data blocks B1, B2, B3 of ordinary sizes. The transaction B1-B3 is inserted into the cell P4 of the probe PB4. At time t6, the probe PB6 between the component C6 and the node ND4 picks up a transaction comprising the block B3 which is inserted into the cell P6 of the probe PB6. Processing the transaction comprising the block B3 by the device TTS leads to the correlation thereof with the block B3 of the transaction B1-B3 memorized in the cell P4. Consequently, only the block B3 is removed from the cell P4. At time t7, the probe PB5 between the component C5 and the node ND4 picks up a transaction comprising the block B1 which is inserted into the cell P5 of the probe PB5. The transaction comprising the block B1 is then correlated by the device TTS with the block B1 of the transaction B1-B3 memorized in the cell P4. The block B1 is therefore removed from the cell P4. At time t8, the probe PB7 between the component C7 and the node ND4 picks up a transaction comprising the block B2, which is inserted into the cell P7 of the probe PB7. The transaction comprising the block B2 is then correlated by the device TTS with the block B2 of the transaction B1-B3 memorized in the cell P4. The block B2 is therefore eventually removed from the cell P4. The partial correlation of a transaction with a part of another transaction stored in a cell of the set TRST is configured thanks to an algorithm provided in the base ALDB and allotted to the links to which the probes PB1-PB4 are connected.

It is to be noted that instead of removing a block correlated with a transaction in a cell, a correlation mark may be memorized in the cell in relation with each block of the transaction. At each correlation of a block, the mark corresponding to the block is updated in the cell and when all the blocks of the transaction are marked correlated, the transaction is removed from the cell.

Embodiments of a device TTS may be made in the form of software executed by a computer simulating or connected to the system SOC to be tested or simulating a part of the system and connected to other parts of the system.

It will be clear to those skilled in the art that the present disclosure is susceptible of various embodiments and applications. In particular, the disclosure is not limited to systems on chip, but may be applied to any system comprising a data transmission network. In addition, it is not necessary to memorize the transactions in the cells, each allotted to a link of the system to be tested. Each transaction to be correlated just needs to be memorized or stored, so as to be able to determine on which link a memorized transaction has been picked up, for example in association with a link or probe identifier. It is not necessary either, although it may be less efficient, to limit the search of the related transactions to the transactions picked up in the links adjacent to the link where the transaction to be correlated has been picked up.

In some simple systems, one transaction comparison algorithm may be enough. It is therefore not necessary to provide a step for selecting such an algorithm to detect a correlation between two transactions.

Embodiments of the present disclosure are not limited either to a particular format of transmission to the output modules OUTM of information relating to the detected correlations. Thus a correlation link between two transactions may be transmitted to the modules OUTM by successively supplying information relating to a transaction and the related transaction, for example as previously described, or by simply supplying the data relating to a transaction and an identifier of the related transaction, which has previously been transmitted to the output modules. It may also be provided to memorize all the transactions picked up in a memory accessible to the output modules, and to transmit to the modules only pairs of identifiers of transactions correlated between them.

In addition, the present disclosure is not limited to the transaction comparison algorithms previously described. Indeed, it may be provided other transaction comparison algorithms, particularly algorithms adapted to the content of particular transactions.

The present disclosure is not limited either to a particular transaction format, the structure of this format resulting from an arbitrary choice.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
using at least one processing device to monitor transactions in a network comprising at least one node and at least two links for transmitting data connected to the node and managed in accordance with at least one data transmission protocol, by:
picking up transactions transmitted by links of the network;
converting the transactions picked up into a same format;
storing converted transactions, the storing including providing an indication of a link associated with a transaction; and
comparing a converted transaction with stored converted transactions and, based on whether the comparison reveals a correspondence between the converted transaction and a stored converted transaction, correlating the converted transaction and the stored converted transaction.

2. The method of claim 1, comprising limiting the comparing of a converted transaction to stored converted transactions picked up a links adjacent to a link where the converted transactions was picked up.

3. The method according to claim 1 wherein comparing two transactions comprises executing on data of the two transactions a comparison algorithm selected according to a type of the links where the two transactions have been picked up.

4. The method according to claim 3 wherein the comparison algorithm is selected from a set of comparison algorithms comprising an algorithm which supplies a positive correlation result when the content of the two transactions is identical, and algorithms which supply a positive correlation result when content of one of the two transactions is located in the other transaction.

5. The method according to claim 1 wherein each transaction converted is stored in a temporary storage cell selected according to the link where the transaction has been picked up, a cell being allotted to each link where a transaction may be picked up.

6. The method according to claim 5, comprising removing a stored transaction from the cell where it is stored when it has totally been correlated with one or more other transactions.

7. The method according to claim 1 wherein a converted transaction comprises transaction beginning and end data, transaction content data, a piece of information indicating if the transaction is of the request or answer type, a transaction identifier, and if the transaction is of the answer type, an identifier of a transaction of the request type corresponding to the transaction of the answer type.

8. The method according to claim 7 wherein only the transactions of the request type are stored in preparation for a comparison with another transaction.

9. The method according to claim 7, comprising correlating a transaction of the answer type with a stored transaction of the request type, and deleting the stored transaction of the request type only if the transaction of the request type may not be propagated to other links and if the link where the transaction of the request type has been picked up may not transmit a transaction of the answer type corresponding to the transaction of the request type before the request is executed by the network.

10. A device, comprising:
means for monitoring transactions transmitted over a plurality of transmission links of a network;
means for converting monitored transactions into a first format;
means for storing converted transactions and indications of transmission links of the stored converted transactions; and
means for comparing a converted transaction with stored converted transactions and for correlating a converted transaction with a stored converted transaction based on whether the comparison reveals a correspondence between the transactions.

11. The device according to claim 10 wherein the means for monitoring transactions comprises a plurality of probes, each probe coupled to a respective link and to the means for converting.

12. The device according to claim 11 wherein the means for storing comprises a set of memory cells each associated with a respective probe in the plurality of probes.

13. The device according to claim 10, further comprising at least one output module configured to receive pairs of correlated transactions and to process information in the pairs, the processing including at least one of the following:
an analysis of propagation of transactions in the network;
saving the information;
a display of the information on a visualization screen;
a determination of transmission latencies;
a generation of statistics of transmission or network load; and a user-defined process.

14. A non-transitory computer readable memory medium whose contents cause at least one processor to perform a method, the method comprising:
monitoring transactions transmitted over a plurality of links of a network;
converting monitored transactions to a first format;
storing converted transactions, and, for each stored converted transaction, providing an indication of a link on which the transaction was transmitted; and
comparing a converted transaction with stored converted transactions and correlating a converted transaction with a stored converted transaction based on whether the comparison reveals a correspondence between the transactions.

15. The computer readable memory of claim 14 wherein the comparing is limited to comparing the converted transaction with stored converted transactions associated with links adjacent to a link associated with the converted transaction.

16. The computer readable memory of claim 14 wherein comparing two transactions comprises executing on data of the two transactions a comparison algorithm selected according to link types associated with the two transactions.

17. The computer readable memory of claim 16 wherein the comparison algorithm is selected from a set of comparison algorithms comprising an algorithm which supplies a positive correlation result when content of the two transactions is identical, and algorithms which supply a positive correlation result when content of one of the two transactions is located in the other transaction.

18. The computer readable memory of claim 14 wherein each transaction converted is stored in a temporary storage cell selected according to a link on which the monitored transaction was transmitted.

19. The computer readable memory of claim 18 wherein the method further comprises deleting a stored transaction from the cell where it is stored based on whether the transaction has been correlated with one or more other transactions.

20. The computer readable memory of claim 14 wherein the first format comprises transaction beginning and end data, transaction content data, a piece of information indicating if the transaction is of the request or answer type, a transaction identifier, and if the transaction is of the answer type, an identifier of a transaction of the request type corresponding to the transaction of the answer type.

21. The computer readable memory of claim 20 wherein the method comprises correlating a transaction of the answer type with a stored transaction of the request type, and deleting the stored transaction of the request type only if the transaction of the request type may not be propagated to other links and if the link where the transaction of the request type was transmitted may not transmit a transaction of the answer type corresponding to the transaction of the request type before the request is executed by the network.

22. The computer readable memory of claim 14 wherein only transactions of a request type are stored in preparation for a comparison with another transaction.

23. A device, comprising:
a plurality of probes configured to monitor transactions transmitted over a plurality of transmission links of a network;
a transaction conversion module configured to convert monitored transactions into a first format;
a memory configured to store converted transactions and provide indications of respective transmission links of the stored converted transactions; and a transaction logic module configured to compare a converted transaction with stored converted transactions and based on whether the comparison reveals a correspondence between the converted transaction and a stored converted transaction, to correlate the converted transaction and the stored converted transaction.

24. The device of claim 23 wherein the transaction conversion module comprises a plurality of transaction converters each coupled to a respective probe of the plurality of probes.

25. The device of claim 23 wherein the memory comprises a set of memory cells each associated with a respective probe in the plurality of probes and configured to store converted transactions.

26. The device of claim 25 wherein the transaction logic module is configured to remove a stored transaction from a cell where it is stored based on whether it has been correlated with one or more other transactions.

27. The device of claim 23 wherein the transaction logic module is configured to limit the comparing of a converted transaction to stored converted transactions transmitted on links adjacent to a link where the converted transaction was transmitted.

28. The device of claim 23 wherein the transaction logic module is configured to execute, on data of two transactions, a comparison algorithm selected according to transmission link types of the two transactions.

29. The device of claim 28 wherein the transaction logic module is configured to select the comparison algorithm from a set of comparison algorithms comprising an algorithm which supplies a positive correlation result when content of the two transactions is identical, and algorithms which supply a positive correlation result when content of one of the two transactions is located in the other transaction.

30. The device of claim 23 wherein the first format comprises transaction beginning and end data, transaction content data, a piece of information indicating if the transaction is of the request or answer type, a transaction identifier, and if the transaction is of the answer type, an identifier of a transaction of the request type corresponding to the transaction of the answer type.

31. The device of claim 23 wherein the memory is configured to store only transactions of a request type in preparation for a comparison with another transaction.

32. The device of claim 23 wherein the transaction logic module is configured to correlate a transaction of an answer type with a stored transaction of a request type, and delete a stored transaction of the request type only if the transaction of the request type may not be propagated to other links and if the link where the transaction of the request type was transmitted may not transmit a transaction of the answer type corresponding to the transaction of the request type before the request is executed by the network.

33. A system, comprising:
 a plurality of nodes;
 a plurality of probes configured to monitor transactions transmitted over a plurality of links, the links coupled to nodes of the system;
 a transaction conversion module configured to convert monitored transactions into a first format;
 a memory configured to store converted transactions and to indicate links on which the stored converted transactions were transmitted; and
 a transaction logic module configured to compare a converted transaction with stored converted transactions and when the comparison reveals a correspondence between the converted transaction and a stored converted transaction, to correlate the converted transaction and the stored converted transaction.

34. The system of claim 33 wherein the memory comprises a set of memory cells each associated with a respective probe in the plurality of probes and configured to store converted transactions.

35. The system of claim 34 where the transaction logic module is configured to remove a stored transaction from a cell where it is stored based on whether the transaction is correlated with one or more other transactions.

* * * * *